(12) United States Patent
Motokura et al.

(10) Patent No.: US 10,071,313 B2
(45) Date of Patent: Sep. 11, 2018

(54) NON-TRANSITORY COMPUTER-READABLE STORAGE MEDIUM, GAME APPARATUS, GAME SYSTEM AND GAME PROCESSING METHOD

(71) Applicant: NINTENDO CO., LTD., Kyoto (JP)

(72) Inventors: Kenta Motokura, Kyoto (JP); Katsuyasu Ando, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 708 days.

(21) Appl. No.: 14/089,807

(22) Filed: Nov. 26, 2013

(65) Prior Publication Data

US 2015/0080123 A1 Mar. 19, 2015

(30) Foreign Application Priority Data

Sep. 13, 2013 (JP) .................................. 2013-190517

(51) Int. Cl.
*A63F 13/00* (2014.01)
*A63F 13/56* (2014.01)
(Continued)

(52) U.S. Cl.
CPC .............. *A63F 13/56* (2014.09); *A63F 13/58* (2014.09); *A63F 13/69* (2014.09); *A63F 13/847* (2014.09)

(58) Field of Classification Search
CPC ...................................................... A63F 13/56
See application file for complete search history.

(56) References Cited

U.S. PATENT DOCUMENTS 6,371,855 B1 * 4/2002 Gavriloff ................ A63F 13/12
463/1
2005/0119050 A1 6/2005 Suzuki
(Continued)

FOREIGN PATENT DOCUMENTS

| JP | 2005-152509 | 6/2005 |
| JP | 2005-287757 | 10/2005 |
| JP | 2013-54519 | 3/2013 |

OTHER PUBLICATIONS

Office Action dated Feb. 6, 2018 in counterpart Japanese Application No. 2013-190517 and English-language translation (translated Feb. 22, 2018).
(Continued)

*Primary Examiner* — Kang Hu
*Assistant Examiner* — Thomas H Henry
(74) *Attorney, Agent, or Firm* — Nixon & Vanderhye, P.C.

(57) ABSTRACT

The present disclosure provides a novel game apparatus on which a plurality of characters are controlled in a virtual space. An example game apparatus 10 executing a game in which each of a plurality of players controls his/her plurality of characters in a virtual space includes a first input unit 11 and a second input unit 12 for receiving a command from a first player and a second player respectively, and an information processing unit 14 causing the characters controlled by the first player to act according to a first player's command and causing the characters controlled by the second player to act according to a second player's command, wherein the plurality of characters controlled by the first player are on an equality with each other and the plurality of characters controlled by the second player are on an equality with each other.

11 Claims, 9 Drawing Sheets

(51) Int. Cl.
  *A63F 13/69* (2014.01)
  *A63F 13/847* (2014.01)
  *A63F 13/58* (2014.01)

(56) References Cited

U.S. PATENT DOCUMENTS

2005/0176502 A1* 8/2005 Nishimura .............. A63F 13/10
  463/31
2005/0221880 A1 10/2005 Kando
2008/0161113 A1* 7/2008 Hansen ................... A63F 13/12
  463/42

OTHER PUBLICATIONS

Office Action dated Jul. 11, 2017 in counterpart Japanese Application No. 2013-190517.
English language translation of Notification of Reasons for Refusal dated Jul. 11, 2017 in counterpart Japanese Application No. 2013-190517 (translated Aug. 25, 2017).

* cited by examiner

NON-TRANSITORY COMPUTER-READABLE STORAGE MEDIUM, GAME APPARATUS, GAME SYSTEM AND GAME PROCESSING METHOD

CROSS REFERENCE TO RELATED APPLICATION

The disclosure of Japanese Patent Application No. 2013-190517 filed on Sep. 13, 2013 is incorporated herein by reference in its entirety.

FIELD

The technology herein relates to a non-transitory computer-readable storage medium, game apparatus, game system, and game processing method and, in particular, to a non-transitory computer-readable storage medium, game apparatus, game system and game processing method of executing a game where characters are controlled in a virtual space.

BACKGROUND AND SUMMARY

Games in which a player controls a character in a virtual space in attempt to achieve a predetermined objective (for example, to earn points while averting attacks by opponents or attacking opponents in attempt to reach a goal) are known. Some of such games include a multiplayer mode in which multiple players control their respective characters in a virtual space to compete with each other in order to achieve a goal first or control their respective characters to cooperate with each other to achieve an objective.

A feature is also known that adds a character controlled in a virtual space in the game when a character satisfies a predetermined condition (for example when a character acquires a predetermined item).

The present disclosure provides a novel game in which a plurality of characters are controlled in a virtual space.

A non-transitory computer-readable storage medium of an example embodiment stores a game program to be executed by a computer of a game apparatus. The game apparatus includes a first input unit for receiving a command from a first player and a second input unit for receiving a command from a second player and executes a game where each of a plurality of players controls a plurality of his/her own characters in a virtual space. Specifically, the game program causes the computer to function as an information processing unit causing a plurality of characters existing in the virtual space and controlled by the first player to act according to the command received by the first input unit and causing a plurality of characters existing in the virtual space and controlled by the second player to act according to the command received by the second input unit. Here, the plurality of characters controlled by the first player are on an equality with each other and the plurality of characters controlled by the second player are on an equality with each other. According to this configuration, when any of the plurality of characters disappears, the game can be continued as long as at least one character is surviving.

The information processing unit may add a character controlled by the first player when any of the characters controlled by the first player satisfies a predetermined condition for adding a character, and may add a character controlled by the second player when any of the plurality of characters satisfies a predetermined condition for adding a character. According to this configuration, the number of characters controlled by each of the first and second players can be increased.

The condition for adding a character may be that any of the characters controlled by the first player performs a predetermined action on any of the characters controlled by the second player, and when the condition is satisfied, the information processing unit may add a character controlled by the first player by changing the character controlled by the second player on which the action has been performed to a character controlled by the first player. The condition for adding a character may be that any of the characters controlled by the second player performs a predetermined action on any of the characters controlled by the first player and, when the condition is satisfied, the information processing unit may add a character controlled by the second player by changing the character controlled by the first player on which the action has been performed to a character controlled by the second player. According to this configuration, the first player can capture any of the plurality of characters controlled by the second player as the first player's own and the second player can capture any of the plurality of characters controlled by the first player as the second player's own.

The information processing unit may add the character on conditions that the addition does not cause a predetermined upper limit of the number of the characters to be exceeded. This configuration is capable of preventing the number of characters from increasing infinitely.

The predetermined upper limit may be an upper limit of the sum of the numbers of characters controlled by all of the plurality of players. This configuration is capable of preventing the sum of the numbers of characters from increasing infinitely.

The information processing unit may provide the same ability to all of the plurality of characters controlled by the first player and may provide the same ability to all of the plurality of characters controlled by the second player. According to this configuration, when the first and second players command their respective groups of characters to act, degradation of controllability due to a difference in ability between their respective characters can be avoided.

When the information processing unit changes an ability of any of the characters controlled by the first player, the information processing unit may change the ability of the other characters controlled by the first player in the same way, and when the information processing unit changes an ability of any of the characters controlled by the second player, the information processing unit may change the ability of the other characters controlled by the second player in the same way. According to this configuration, when the first and second players command their respective groups of characters to act, degradation of controllability due to a difference in ability between their respective characters can be avoided.

When the information processing unit improves an ability of any of the characters controlled by the first player, the information processing unit may improve the ability of the other characters controlled by the first player in the same way, and when the information processing unit improves an ability of any of the characters controlled by the second player, the information processing unit may improve the ability of the other characters controlled by the second player in the same way. According to this configuration, since the abilities of the plurality of characters controlled by the first player are improved in the same way and the abilities of the plurality of characters controlled by the second player are improved in the same way, degradation of controllability due to a difference in ability between their respective characters when the first and second players command their respective groups of characters can be avoided.

When any of the characters controlled by the first player is attacked by a character controlled by the second player, the information processing unit may restrict movement of the attacked character, and when any of the characters controlled by the second player is attacked by a character controlled by the first player, the information processing unit may restrict movement of the attacked character. According to this configuration, since movement of a character controlled by a player is restricted by an attack by a character controlled by another player, the relative positional relation between the plurality of characters controlled by the attacked player changes.

When any of the characters controlled by the first player satisfies a predetermined damage condition, the information processing unit may eliminate the character from the virtual space, and when any of the characters controlled by the second player satisfies a predetermined damage condition, the information processing unit may eliminate the character from the virtual space. According to this configuration, some of the plurality of characters controlled by each of the first and second players can disappear but the plurality of characters controlled by the first player are on an equality with each other and the plurality of characters controlled by the second player are on an equality with each other. Accordingly, the game can be continued as long as at least one of the characters controlled by the first player and at least one of the characters controlled by the second player are surviving.

The plurality of characters controlled by the first player may have the same appearance as each other, the plurality of characters controlled by the second player may have the same appearance as each other, and the appearance of the characters controlled by the first player may differ from the appearance of the characters controlled by the second player. This configuration is capable of making each of the first and second players feel as if the player were commanding the entire group of his/her characters to act.

A game apparatus of an example embodiment executes a game in which each of a plurality of players controls a plurality of characters of the player in a virtual space. The game apparatus includes a first input unit for receiving a command from the first player, a second input unit for receiving a command from the second player, and an information processing unit causing a plurality of characters existing in the virtual space and controlled by the first player to act according to the command received by the first input unit and causing a plurality of characters existing in the virtual space and controlled by the second player to act according to the command received by the second input unit. The plurality of characters controlled by the first player are on an equality with each other and the plurality of characters controlled by the second player are on an equality with each other. According to this configuration, when any of the plurality of characters disappears, the game can be continued as long as at least one of the characters controlled by each of the players is surviving.

A game system of an example embodiment executes a game in which each of a plurality of players controls a plurality of characters of the player in a virtual space. The game system includes a first input unit for receiving a command from the first player, a second input unit for receiving a command from the second player, and an information processing unit causing a plurality of characters existing in the virtual space and controlled by the first player to act according to the command received by the first input unit and causing a plurality of characters existing in the virtual space and controlled by the second player to act according to the command received by the second input unit. The plurality of characters controlled by the first player are on an equality with each other and the plurality of characters controlled by the second player are on an equality with each other. According to this configuration, when any of the plurality of characters disappears, the game can be continued as long as at least one of the characters controlled by each of the players is surviving.

A game processing method of an example embodiment executes a game in which each of a plurality of players controls a plurality of characters of the player in a virtual space. The game processing method includes a first input step of receiving a command from the first player, a second input step of receiving a command from the second player, and an information processing step of causing a plurality of characters existing in the virtual space and controlled by the first player to act according to the command received at the first input step and causing a plurality of characters existing in the virtual space and controlled by the second player to act according to the command received at the second input step. The plurality of characters controlled by the first player are on an equality with each other and the plurality of characters controlled by the second player are on an equality with each other. According to this configuration, when any of the plurality of characters disappears, the game can be continued as long as at least one of the characters controlled by each of the players is surviving.

According to the technology described in the present application, the game can be continued as long as at least one character is surviving even if any of a plurality of characters disappears.

DETAILED DESCRIPTION OF NON-LIMITING EXAMPLE EMBODIMENTS

Non-limiting example embodiments of the present technology will be described with reference to the accompanying drawings. The non-limiting example embodiments described below are only illustrative of implementation of the present technology and are not intended to limit the present technology to the specific configurations described below. Any specific configurations may be employed to implement the present technology according to embodiments.

Figure 1:
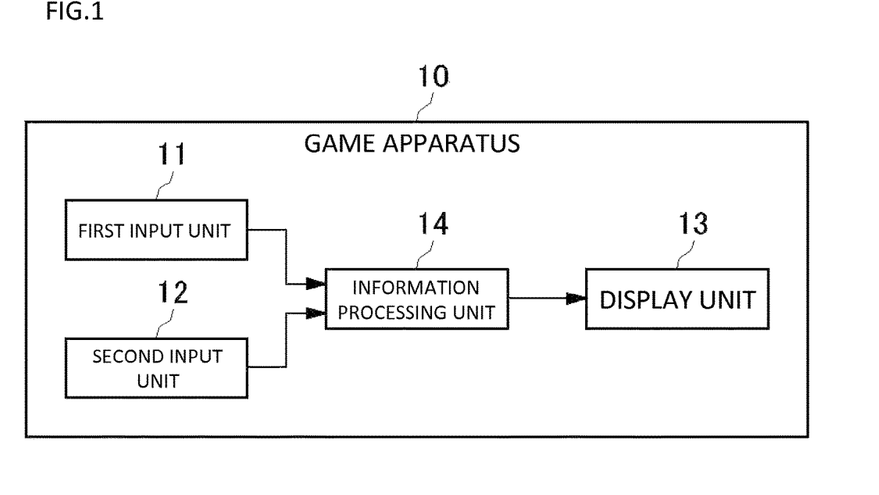
FIG. 1 shows a configuration of an example non-limiting apparatus.

FIG. 1 shows a configuration of an example non-limiting game apparatus. The game apparatus 10 includes a first input unit 11, a second input unit 12, a display unit 13 and an information processing unit 14. Note that the game apparatus 10 may be a portable game apparatus that incorporates the first input unit 11, the display unit 13 and the information processing unit 14 in one and has a communication facility.

Alternatively, the first input unit 11 and the second input unit 12 of the game apparatus 10 may be separate controllers. The information processing unit 14 may be a game machine main unit that receives operation signals via cable or wirelessly from the controllers, which are the first input unit 11 and the second input unit 12. The display unit 13 may be an interface that sends video signals to a monitor on the game machine main unit. Alternatively, the game apparatus 10 may be configured so that the functions of such a game machine are provided on a game server on a network, user operations on a controller are sent to the game server over the network as operation signals, and video signals sent from a display unit 13 of the game server over the network are displayed on user's monitor.

Alternatively, the game apparatus 10 may be configured as a game system including a game server on a network and a game terminal capable of communicating with the network game server. In that case, the game server provided with the functions of the information processing unit 14 and the game terminal is equipped with the first input unit 11, the second input unit 12 and the display unit 13. A game terminal equipped with the first input unit 11 and the display unit 13 and a separate game terminal equipped with the second input unit 12 and the display unit 13 may be provided. In the game system, operations on the first input unit 11 and the second input unit 12 by users are sent to the game server as operation signals over the network and video signals sent from the game server over the network are displayed on the display units 13 of the game terminals.

The information processing unit 14 is a computer including a processor, a memory, a storage, and other components. The computer executes a game program of the example non-limiting embodiment to implement the information processing unit 14 of the example non-limiting embodiment. The information processing unit 14 may be configured as a single apparatus or partial functions of the information processing unit 14 may be distributed among a plurality of apparatuses. The game program may be provided via a storage medium such as a cartridge to the game machine, or may be preinstalled in the game machine at the time of manufacture of the game machine, or may be downloaded by the game machine over the network to the game machine.

The first input unit 11 and the second input unit 12 may be controllers including a directional control for specifying a direction and a plurality of buttons for issuing commands for executing various actions, which will be described later. The directional control may be a cross-keypad for specifying up, down, left and right directions or may be a 360-degree stick for steplessly specifying directions. Each of the first input unit 11 and the second input unit 12 functioning as controllers may include an acceleration sensor to detect acceleration produced by a player moving the controller, thereby accepting a command that specifies a direction. Each of the first input unit 11 and the second input unit 12 may include an image pickup unit that captures an image of an action of the player to accept a command from the player.

While the present non-limiting example embodiment will be described by taking an example where the game apparatus 10 includes two input units and has a multiplayer mode in which two players play, the game apparatus 10 may have a multiplayer mode in which three or more players can play. In that case, the game apparatus 10 includes as many input units as the number of the players.

An overview of a game executed on the game apparatus 10 will be described first. The game has a singleplayer mode in which a single player plays and a multiplayer mode in which a plurality of players play at the same time. Details common to the singleplayer mode and the multiplayer mode will be described by taking the singleplayer mode as an example for simplicity.

The objective of the game is for a player (user) to control a character in a virtual space to move the character in the virtual space to reach a goal. The player can control the character to perform actions. The actions performed by the character include movement and various actions. Examples of movement include walking (on land), running, climbing (a wall and the like), and swimming (surface and underwater). Examples of actions include jumping and other actions. The character can also fly (in the air) and can use attack items according to moving abilities and action abilities.

Constructions, opponents, obstacles and various kinds of items are provided in the virtual space. The player controls the character to move toward the goal in the virtual space while averting or protecting against attacks from opponents and obstacles, attacking opponents and obstacles, and earning points by acquiring items. Details of the game will be described below.

[Clones]

Figure 2:
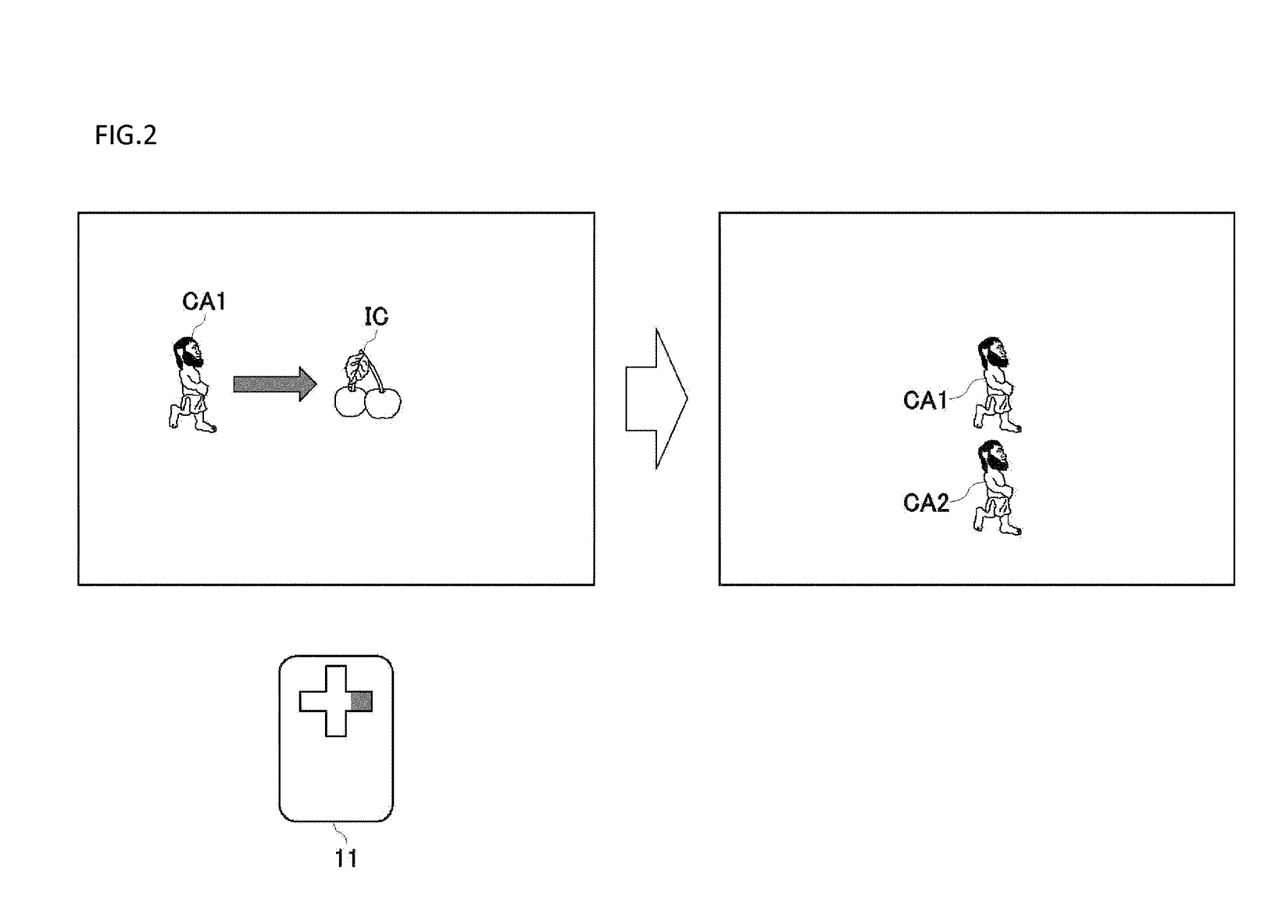
FIG. 2 shows an example non-limiting screen in which a clone character appears and an example non-limiting operation on a controller.

When a predetermined condition for addition is satisfied, such as when the character acquires a predetermined cloning item, a clone of the character is added in the virtual space. Specifically, the character can produce a clone of the character. Hereinafter, one or more of a plurality of characters produced as clones will be sometimes referred to as "clone character(s)". FIG. 2 shows an example non-limiting screen where a clone character is produced and an operation on a controller for producing a clone character. When a character CA1 acquires a cherry item IC, which is a cloning item, a clone character CA2 is produced. As illustrated in FIG. 2, the clone character CA2 is a replica of the original character CA1 that has produced the clone character CA2 and has the same appearance as the original character CA1.

In order to allow the character CA1 to acquire the cherry item IC, the player operates the controller 11 to move the character CA1 to the location of the cherry item IC. Since the cherry item IC is located to the right of the character CA1 in the example in FIG. 2, the player operate the right button on the controller 11 to move the character CA1 rightward to allow the character CA1 to acquire the cherry item IC.

When any of clone characters produced satisfies a predetermine condition for producing a clone, an additional clone character is produced. In this way, the player can repeatedly produce a clone character to increase the number of characters. However, an upper limit of the number of clone characters is preset and once the upper limit is reached, no additional clone character is produced even when the predetermined condition for producing a clone is satisfied.

Once a clone character is produced so that there are multiple characters, the characters are not in a leader-follower relationship. The player can control the plurality of characters by issuing a single command. Specifically, when the player issues, for example, a command to move the character in a particular direction, all of the characters including the clone character(s) move together in that direction in the virtual space; when the player issues a command to cause the character to jump, all of the characters including the clone character(s) jump together in the virtual space; when the player issues a command to cause the character to attack, all of the characters in including the clone character(s) attack together.

The plurality of characters including the clone character(s) are not in a leader-follower relationship but are on an equality with each other. When a character satisfies a predetermined extinction condition, the character that satisfies the extinction condition dies and disappears from the virtual space as will be described later. However, since the plurality of characters are not in a leader-follower relationship but are on an equality with each other as stated above, the player can continue the game as long as at least one character is surviving even when any of the other characters die.

[Improvement of Abilities]

When a character in the virtual space satisfies a predetermined ability improvement condition, for example when a character acquires an ability improving item, the moving ability or action ability of the character (hereinafter collectively and simply referred to as "ability") can be improved. If there are a plurality of characters due to cloning and any of the characters satisfies the predetermined condition, the ability of all of the characters is improved.

Figure 3:
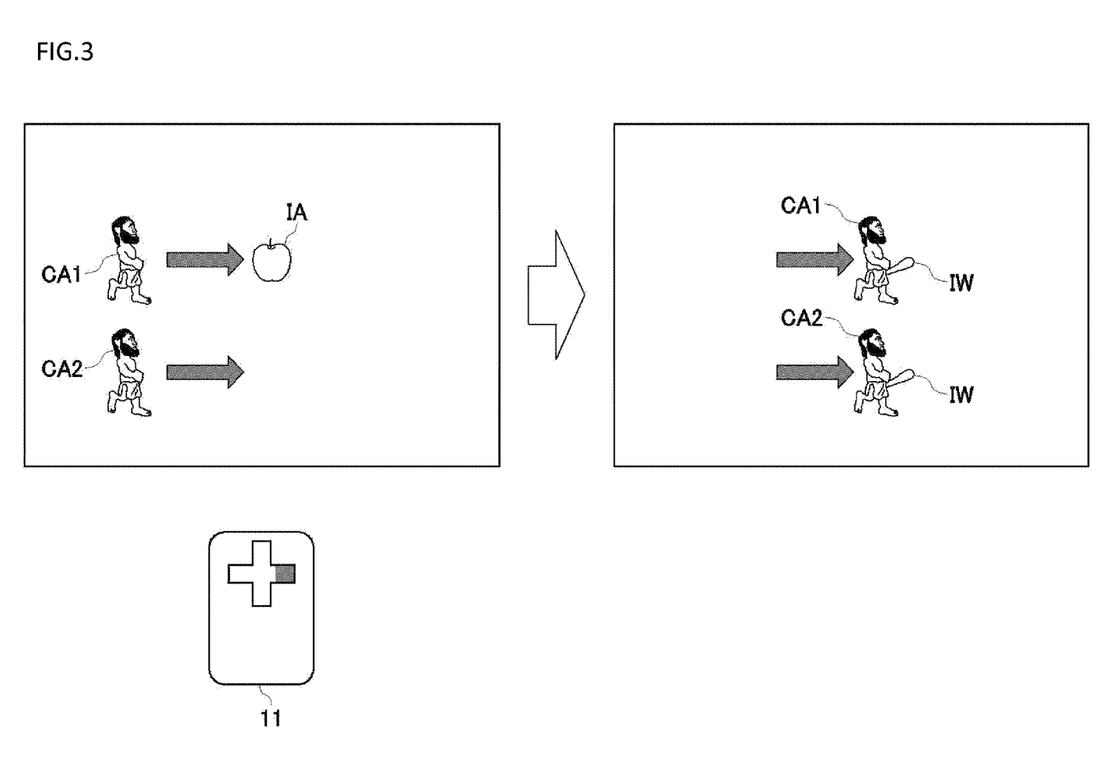
FIG. 3 shows an example non-limiting screen in which an action-ability of a character is raised and an example non-limiting operation on a controller.

FIG. 3 shows an example non-limiting screen where the action ability of characters is improved and an operation on a controller. In the example in FIG. 3, there are two characters CA1 and CA2 because of cloning. When the character CA1 acquires an apple item IA, which is an ability improving item, the ability of the character CA1 that has acquired the apple item IA as well as the ability of the character CA2 is improved. In the example in FIG. 3, attack ability, which is an action ability, is improved.

As the ability is improved, the appearance of the characters CA1 and CA2 changes accordingly. In the example in FIG. 3, the appearance of the characters changes, so that the characters hold a weapon item IW. The improvement of the attack ability allows characters CA1 and CA2 to attack with the weapon item IW.

Examples of improvement of moving ability include speeding up of movement and gaining new ability such as the ability to fly in the air. Since the ability of a plurality of characters is improved at the same time as has described above, conditions are avoided where one or more of the plurality of characters are able to run faster than the others or one or more of the plurality of characters are able to fly in the air so that the plurality of characters readily move away from one another and controllability is degraded.

[Damages]

When a predetermined damage condition is satisfied, such as when a character is attacked, the character is damaged. When a character that has no clone is damaged, the ability of the character is reduced if the ability of the character has been improved; if the ability of the character is at the lowest level (a usual condition) the character dies and disappears. If there are a plurality of characters due to cloning and any of the characters is damaged, only the damaged character dies and the other character(s) survives. In this case, even if the ability of the plurality of characters has been improved, the damaged character dies rather than the ability of the character being reduced.

Figure 4:
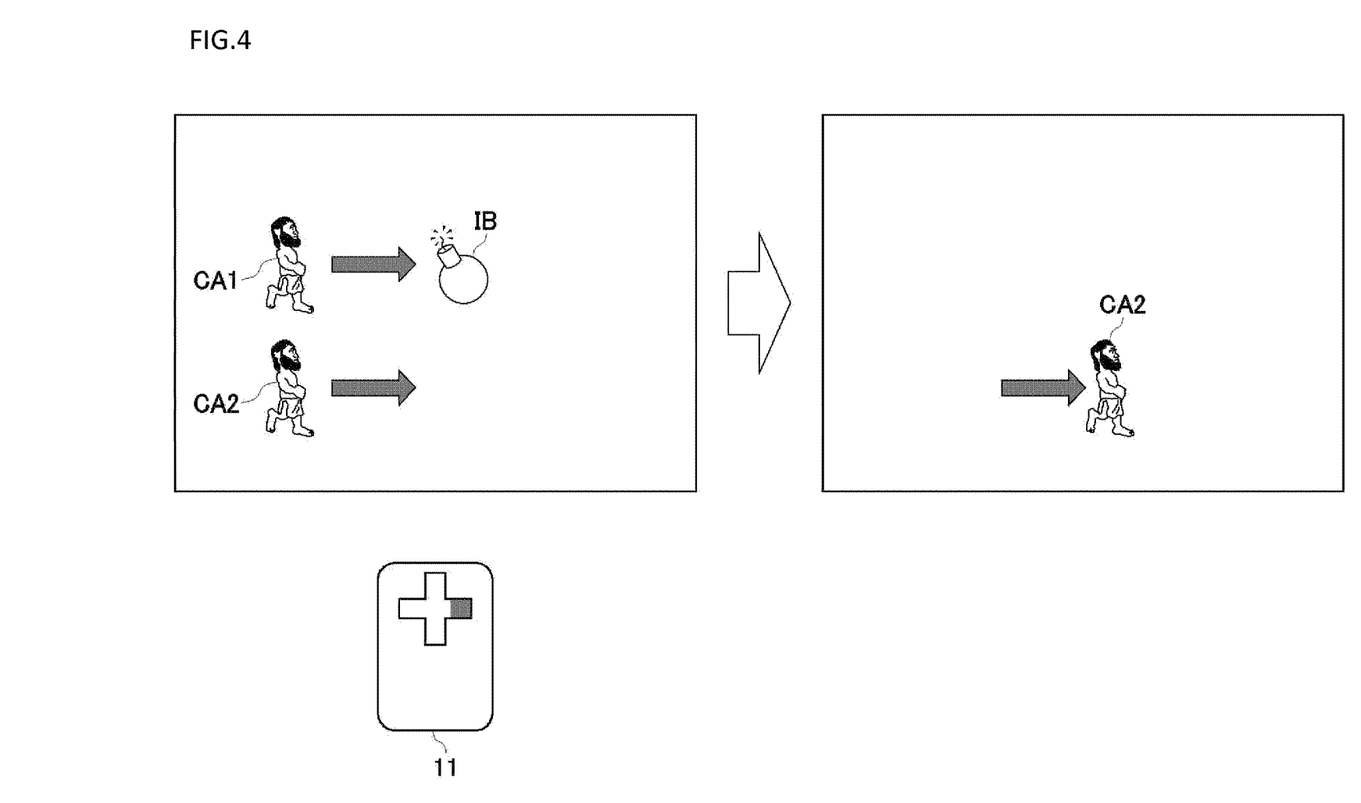
FIG. 4 shows an example non-limiting screen in which a character is damaged and an example non-limiting operation on a controller.

FIG. 4 shows an example non-limiting screen where a character is damaged and an operation on a controller. In the example in FIG. 4, there are two characters CA1 and CA2 due to cloning. When the character CA1 comes in contact with a bomb item IB, which is an attack item, the character CA1 dies and disappears. Here, the character CA2, which has not come into contact with the bomb item IB continues to live.

A character can be damaged when the character comes into contact with an attack item as illustrated in FIG. 4 or when the character is attacked by an opponent character, or when the character moves into a certain damage area in the virtual space.

[Relative Positional Relation Between Characters]

As has been described above, in the game of the present non-limiting embodiment, when a character satisfies a predetermined condition, a clone of the character is produced and the player can control the plurality of characters by issuing a single command. However, if a plurality of characters move excessively far away from one another in the game of the present example non-limiting embodiment in which characters move forward in the virtual space, it will be difficult to control the characters. To avoid this, in a situation where there are a plurality of characters due to cloning in the game of the present example embodiment, the following process is performed for the relative positional relation between a plurality of characters in order to improve the character controllability when a player controls a plurality of characters with a single command.

(Fixed Positional Relation)

Figure 5:
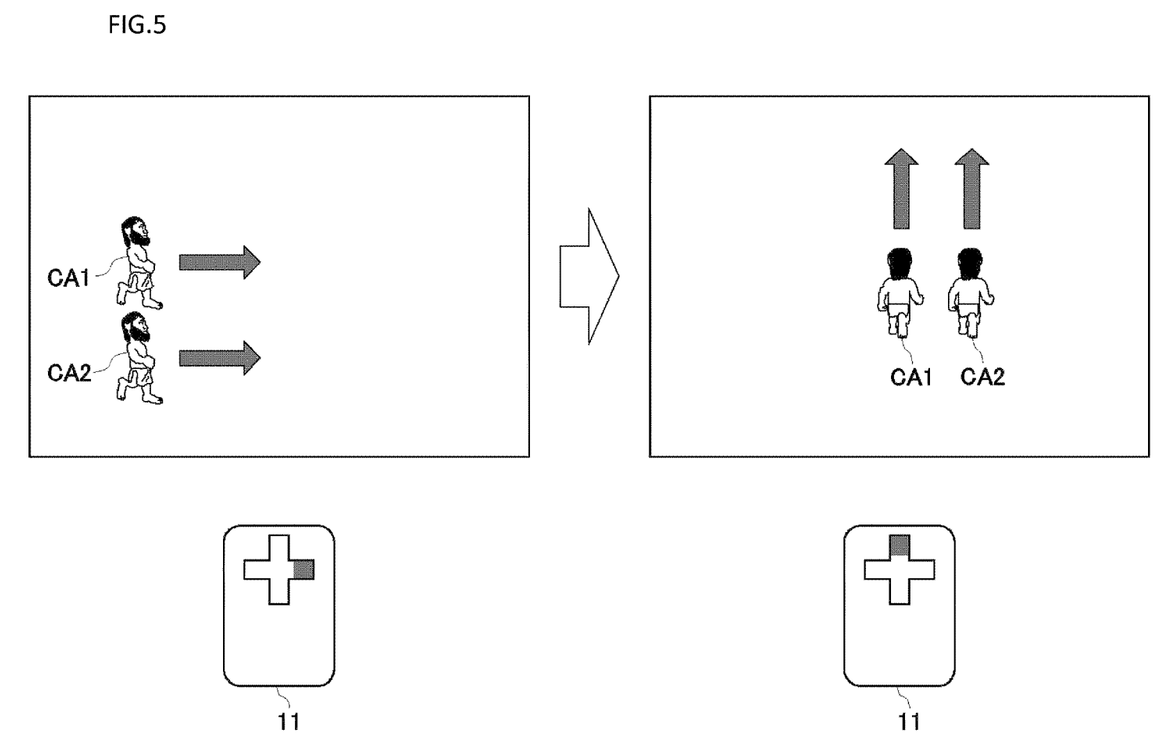
FIG. 5 shows an example non-limiting screen showing a basic positional relation between a plurality of characters and an example non-limiting operation of controller.

When there are a plurality of characters, the basic relative positional relation between the plurality of characters (hereinafter referred to the "fixed positional relation") is such that the characters are located closely side by side. FIG. 5 shows an example non-limiting screen showing the basic positional relation between a plurality of characters and an operation on a controller. When there are a plurality of characters as shown in FIG. 5, the characters are in the basic positional relation in which the characters are located side by side.

When a player use a direction control key on the controller 11 to move characters leftward or rightward as shown in FIG. 5, the plurality of characters arrange themselves vertically. When the player operates the direction control key on the controller 11 to move the characters upward or downward, the plurality of characters arrange themselves horizontally. While two characters are shown in FIG. 5, the same applies to a situation where there are three or more characters. That is, when there are a plurality of characters, the characters arrange themselves in the direction perpendicular to the direction of movement. Similarly when a plurality of characters are moved in an oblique direction, the characters arrange themselves in the direction perpendicular to the direction of movement.

Since characters are arranged in the direction perpendicular to the direction of movement in this way, the player feels as if the player is controlling the plurality of characters at the same time with one command rather than feeling that any of the character is the leader and the other(s) is a follower. That is, if a plurality of characters were arranged horizontally when the characters are moving in a horizontal direction, the player would feel that the character in the front in the direction of movement is the leader and the character(s) in the rear in the direction of movement is the character(s) following the character in the front and feel as if the player was controlling only the character in the front. The present example non-limiting embodiment, on the other hand, does not make the player feel that way but makes the player feel as if the player is controlling all of the characters.

When the movement changes from horizontal to vertical as shown in FIG. 5, the plurality of characters gradually changes the relative positional relation between the characters from vertical to horizontal. Thus, the direction of movement of the plurality of characters can be changed without making the player feel that the relative positional relation is unnaturally changing.

If there are many characters, the characters do not necessarily need to be arranged in a line in the direction perpendicular to the direction of movement. For example, if there are three characters, two of the characters may be arranged in the front in a line in the direction perpendicular to the direction of movement and the remaining one character is placed behind them so that the characters are arranged in inverted triangle. If there are four characters, the characters may be arranged in a square formation. These formations do not impair user's feeling of controlling all of the characters. If characters are arranged in a line or in a triangular or square formation, a certain distance may be maintained between two adjacent characters.

(Restricting Movement)

Blocking areas where characters cannot enter (for example rivers) and obstacle items (for example trees and constructions such as fences) that impede the movement of characters are provided in the virtual space. Those areas and obstacle items prevent characters from moving regardless of a command from the player. If there are a plurality of characters due to cloning and some of the characters are prevented from moving, the plurality of characters cannot maintain the fixed positional relation and the distances between characters will increase.

Figure 6:
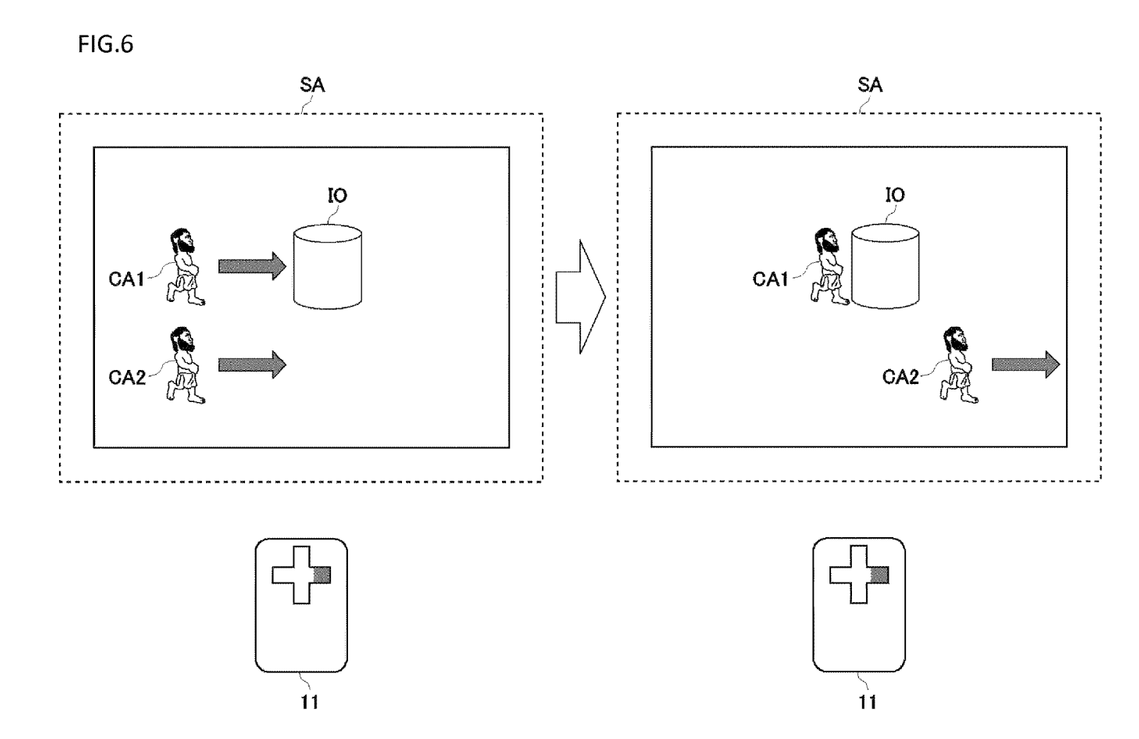
FIG. 6 shows an example non-limiting screen in which an obstacle restricts movement of one or more of characters and an example non-limiting operation on a controller.

FIG. 6 shows an example non-limiting screen where movement of a character is restricted by an obstacle and an operation on a controller. If there are two characters CA1 and CA2 and there is an obstacle item 10 in the direction of movement of the character CA1 (on the right side) as shown in FIG. 6, when the player issues a command to move rightward, the character CA2 moves rightward according to the command from the player whereas the character CA1 is prevented from moving rightward by the obstacle item IO.

As a result, the fixed positional relation between the characters CA1 and CA2 arranged vertically changes so that only the character CA2 moves rightward according to the command whereas the character CA1 is prevented from moving by the obstacle item 10 and remains there. Consequently, the distance between the characters CA1 and CA2 increases.

When the distance between characters increases and exceeds the size of the screen, an image of the virtual space is displayed so as to display the character in the front of the movement. As a result, the character that is prevented from moving goes out of the screen.

A survival area SA is provided outside the screen that has a constant width. A character that goes out of the screen can survive in the survival area SA but, when the distance between the characters increases and the character outside the screen goes out of the survival area SA, the character dies and disappears. Note that when a character is outside the screen, control by the player is effective on the character as long as the character is within the survival area.

When the player continues issuing the command to move rightward in the example in FIG. 6, the image of the screen scrolls with the movement of the character CA2 and the character CA1, which is prevented from moving rightward, eventually goes out of the left screen bound. As the player further continues issuing the command to move rightward, the character CA1 goes out of the survival area SA, dies and disappears. Even when the character CA1 goes out of the screen, control by the player is effective on the character CA1 as well as long as the character CA1 is in the survival area SA. For example, when the character CA1 moves downward together with the character CA2 according to a command to move downward and moves off the obstacle item IO, the character CA1 becomes able to move rightward.

When movement of any of the characters is prevented and the distance between the characters becomes so far that the character goes out of the screen while the character in the front of the movement remains displayed in the screen, the following exceptional handling is performed if the character displayed in the screen moves back toward the character that is prevented from moving. In this case, although the character prevented from moving is in the front in the direction of movement, the virtual space portion including the character that was in the front in the previous direction of movement is displayed, instead of immediately displaying the virtual space portion including the character that was prevented from movement and now in the front in the movement in response to the change of the direction of movement.

(Restoring to Fixed Positional Relation)

When there are a plurality of characters due to cloning, the fixed positional relation is such that the characters are arranged close to each other. However, the distance between the characters can increase due to the presence of a blocking area or an obstacle item. If characters remain far away from each other in this way, the characters disperse in the virtual space, degrading the controllability of the characters with one command from the player. To avoid this, a process for restoring characters that have become far away from each other to the fixed positional relation is performed in the game of the present example non-limiting embodiment.

Figure 7:
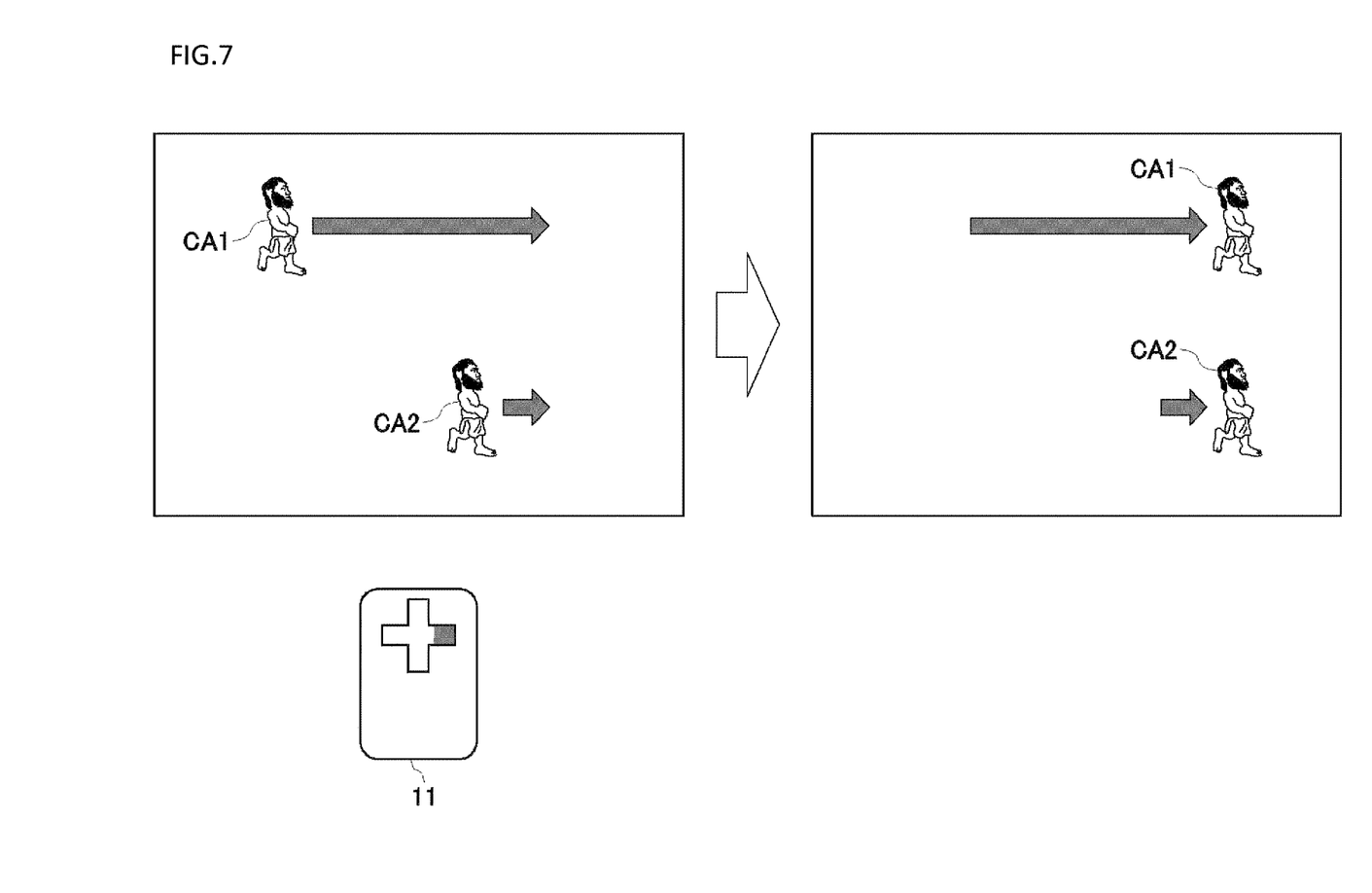
FIG. 7 shows an example non-limiting screen in which a plurality of characters that have moved away from each other are restored to a predetermined relative positional relation and an example non-limiting operation on a controller.

FIG. 7 shows an example non-limiting screen where a plurality of characters that have moved far away from each other are restored to the fixed positional relation and an operation on the controller. There are two characters CA1 and CA2 in the example in FIG. 7. The characters CA1 and CA2 are away from each other both horizontally and vertically. When the player issues a command to move rightward, the character CA2 moves rightward at a predetermined rate of movement whereas the character CA1, which is away from the character CA2 in the left direction and is located behind the character CA2 in the movement direction, moves rightward faster than the character CA2 in order to reduce the distance to the character CA2 in the front in the direction of movement. In this process, the distance between the characters CA1 and CA2 in the vertical direction is not corrected, therefore the characters CA1 and CA2 remain away from each other.

That is, if a command to move is issued when there are a plurality of characters which are farther away from each other than when they are in the fixed positional relation, the character in the front in the direction of movement is moved at a usual rate whereas the character behind in the direction of movement is moved faster than usual so that the character at the rear comes close to the character in the front. This rate correction can bring characters that are far away from each other into the fixed positional relation while keeping the player feeling that he/she is controlling all of the plurality of characters.

Note that the relative positional relation in the directions other than the direction specified by a command in order to reduce the distance is not restored. That is, the all of the characters move only in the direction specified by the player. This can keep the player feeling that the player is controlling the plurality of characters with one command without feeling that that one of the character is the leader (moves according to the command) and the other(s) is a follower (moves in a way different from the way specified by the command). Alternatively, the distance between characters may be reduced not only in the direction specified by the player but also in another direction at the same time. In that case, the characters can more easily return to the fixed positional relation and the relative positional relation can be more quickly restored.

Note that if the player issues a command to move vertically in the example in FIG. 7, the character at the rear in the direction of movement moves closer to the character in the front and thus the vertical distance between the characters CA1 and CA2 is reduced. Note that if the player issues a command to move the character vertically when the characters CA1 and CA2 are horizontally in line with each other as shown in the example screen before movement in FIG. 6, the characters CA1 and CA2 move vertically and one of the characters catches up with the other, so that the characters are arranged side by side (see FIG. 5). Here, the character in the front in the direction of movement and the character that was behind that character and has caught up with that character may squeeze together to position themselves side by side. Furthermore, in a situation where characters cannot position themselves side by side, the character at the rear in the direction of movement may merely catch up with the character in the front and the characters may keep moving in tandem.

Figure 8:
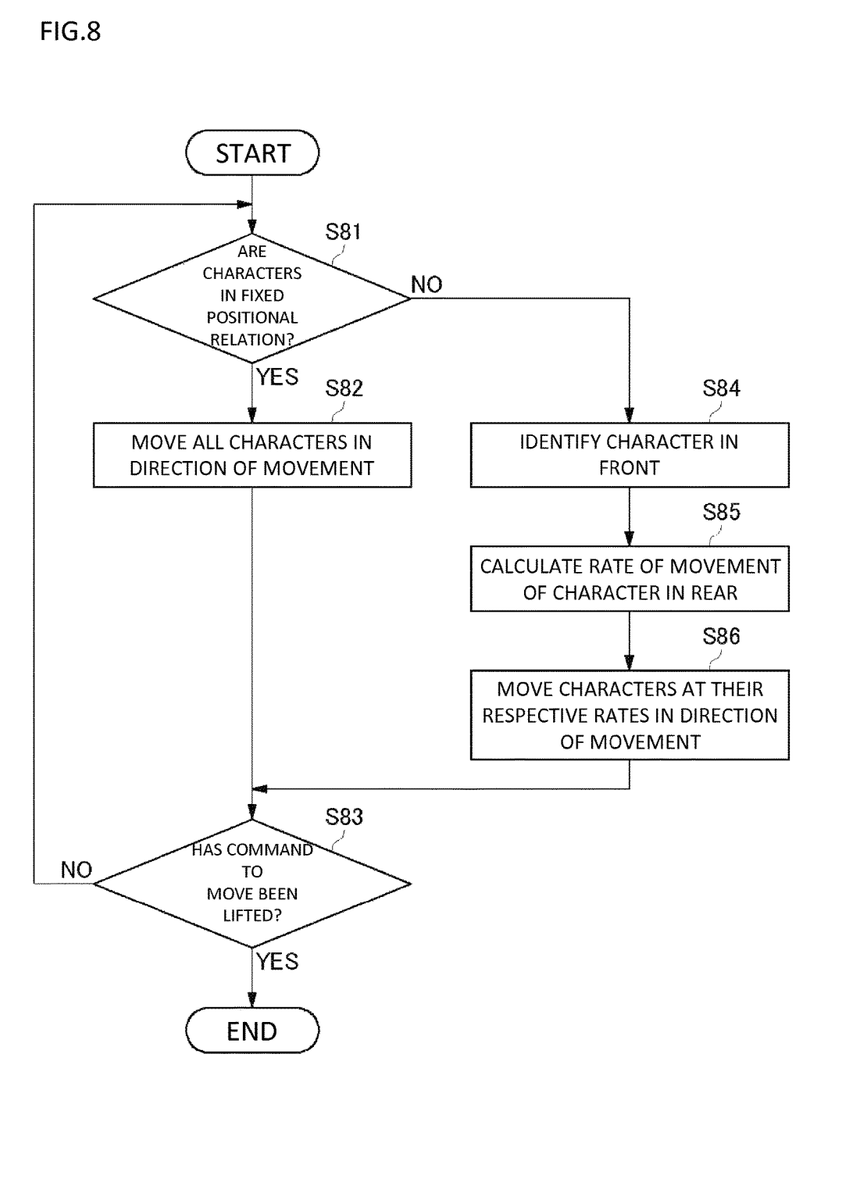
FIG. 8 is a flowchart showing an example non-limiting process for restoring a plurality of characters to a predetermined relative positional relation.

FIG. 8 shows a flowchart of an example non-limiting process for restoring a fixed positional relation between a plurality of characters. When the player issues a command to move, the flow in FIG. 8 is initiated. The information processing unit 14 first determines whether or not all of the characters are in the fixed positional relation (step S81). If all of the characters are in the fixed positional relation (YES at step S81), all of the characters are moved in the direction of movement in a formation according to the direction of movement (step S82). Then the information processing unit 14 determines whether or not the command to move has been lifted (step S83). If the command to move has not been lifted (NO at step S83), the information processing unit 14 returns to step S81, where the information processing unit 14 determines whether or not all of the characters are in the fixed positional relation.

When any of the characters is not in the fixed positional relation with the other characters (NO at step S81), the information processing unit 14 first identifies the character in the front in the direction of movement specified by the player (step S84). There may be more than one character in the front. The information processing unit 14 then calculates the rate of movement of the character in the rear that depends on the distance to the character in the front (step S85), causes the character in the front to move at a usual rate, and causes the character in the rear to move at the calculated rate in the virtual space (step S86). Here, the greater the distance to the character in the front, the higher the calculated rate of movement of the character in the rear is. If a plurality of characters in the fixed positional relation are in the front, those plurality of characters move in a formation according to the direction of movement. When the command to move has not been lifted (NO at step S83), the information processing unit 14 returns to step S81, where the information processing unit 14 determines whether or not all of the characters are in the fixed positional relation, that is, whether or not the character at the rear has caught up with the character in the front as a result of the movements at the different rates.

While the rate of movement of the character in the rear is determined according to the distance to the character in the front, the rate of movement for allowing the character in the rear to catch up with the character in the front may be a rate that is fixed regardless of the distance between the characters. While the character in the front is moved at a usual rate and the character in the rear is moved at a rate faster than the usual rate to reduce the distance between the characters, the character in the rear may be moved at the usual rate whereas the character in the front may be moved at a rate lower than the usual rate, or the character in the rear may be moved at a rate higher than the usual rate whereas the character in the front may be moved at a rate lower than the usual rate to reduce the distance between the characters.

[Multiplayer Mode]

A multiplayer mode in which a plurality of players can play will be described below. In the multiplayer mode, a plurality of kinds of characters corresponding to a plurality of players appear in a virtual space and each of the players can control his/her own character(s). In the multiplayer mode, the same processes as those in the singleplayer mode in which a single player plays a game are performed. That is, processes such as production of clones of a character controlled by each player and restoration of a relative positional relation between the characters described above are performed. Processes added in the multiplayer mode will be described below.

(Capturing Characters)

In the multiplayer mode, when there are a plurality of characters controlled by a plurality of players, a player can control his/her character(s) (hereinafter referred to as the "own character(s)") to perform a certain action on a character controlled by an opponent player, thereby changing the character controlled by the opponent player to a clone character controlled by him/herself. That is, each player can capture one of characters controlled by any other player to change the character to a clone character controlled by him/herself.

In the present example non-limiting embodiment, the action for capturing a character controlled by an opponent player is a "Hip-Drop" or seated senton on the opponent. The "Hip-Drop" is performed by a player operating the down portion of the direction control key when his/her own character drops from above a target toward the target. This action is performed when the own character positioned above a target drops toward a target or when the own character jumps up above a target and then drops toward the target. In the present example non-limiting embodiment, when a player performs the "Hip-Drop" on one of characters controlled by an opponent player, the attacked character controlled by the opponent player is transformed to a character controlled by the attacking player.

Figure 9:
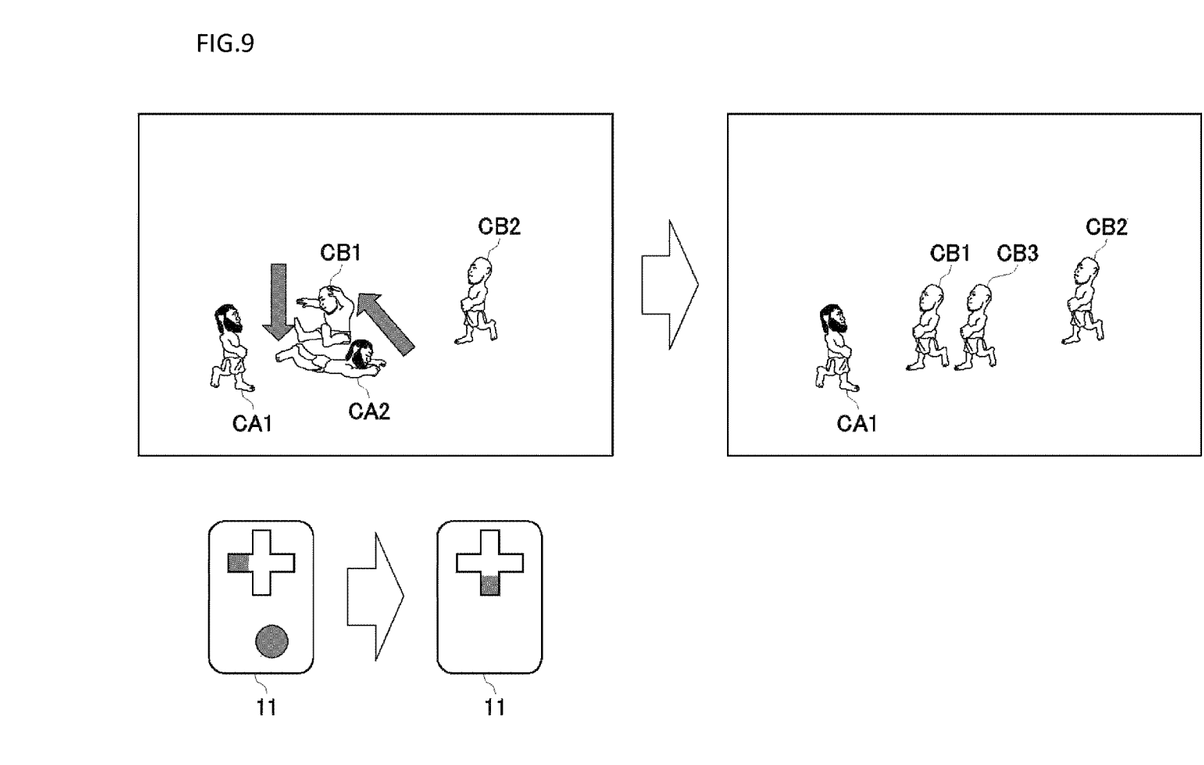
FIG. 9 shows an example non-limiting screen in which a player captures a character of another player and an example non-limiting operation on a controller.

FIG. 9 shows an example non-limiting screen where a player captures a character controlled by an opponent player and an operation on the controller. In the example in FIG. 9, a first player has two characters CA1 and CA2 and a second player has two characters CB1 and CB2. The characters CA1 and CA2 controlled by the first player have the same appearance as each other and the characters CB1 and CB2 controlled by the second player have the same appearance as each other. However, the appearance of the characters CA1 and CA2 controlled by the first player and the appearance of the characters CB1 and CB2 controlled by the second player are different.

In the example in FIG. 9, the character CB1 is located to the right of the character CA2. In this situation, when the second player presses a jump button to command the character CB1 to jump while pointing to the left, the character CB1 jumps up above the head of the character CA2. When the second player points downward at the drop of the character CB1, the character CB1 executes a seated senton on the character CA2. If the seated senton is successfully executed, the character CA2 controlled by the first player is transformed to a character CB3 controlled by the second player. At the same time, the appearance of the character CA2 controlled by the first player is transformed to the appearance of the characters controlled by the second character.

(Attacks to Characters Controlled by Opponent Player)

A player can control his/her own character to attack a character controlled by another player. When a character is attacked by a character controlled by an opponent player, the attacked character fell down on the spot and becomes temporarily unable to move. When one or more of a plurality of characters are attacked by a character controlled by an opponent player, only the attacked character(s) is prevented from moving whereas the other characters are able to move according to a command from the attacked player.

The singleplayer mode has been described earlier by taking an example where the distance between a plurality of characters increases as a character is prevented from moving by a blocking area or an obstacle. In the multiplayer mode, the movement of some of the characters is also restricted by an attack by a character controlled by an opponent player and, as a result, the distance between the plurality of characters increases.

(Other Features)

As in the singleplayer mode described above, the maximum number of characters that can be produced is limited. In the multiplayer mode, an upper limit of the sum of the number of characters controlled by the first player and the number of characters controlled by the second player is preset.

When the distance between a character controlled by the first player and a character controlled by the second player becomes greater than or equal to a predetermined distance in the virtual space, the character of one of the players that is located farther from the goal in the virtual space goes out of the screen. When a character controlled by one of the players goes out of the screen and out of a survival area, the character controlled by that player is forced back to the location of the character controlled by the other player ahead of the player. At this point in time, a character(s) controlled by the player that has forced back disappears and only one character is left for the player.

While the present non-limiting example embodiment has been described in the context of a game whose objective is to move a character in a virtual space to allow the character to reach a goal, games to which the present technology can be applied is not limited to such a game. A game to which the present technology is applied may be a fighting game whose objective is to knock out an opponent character by controlling a character in a virtual space or may be a puzzle game whose objective is to work out a puzzle by controlling a character in a virtual space, or a game of any other type.

REFERENCE SIGNS LIST

10: GAME APPARATUS
11: FIRST INPUT UNIT
12: SECOND INPUT UNIT
13: DISPLAY UNIT
14: INFORMATION PROCESSING UNIT

What is claimed is:

1. A non-transitory computer-readable storage medium having stored therein a game program which, when executed, causes a computer of a game apparatus that includes a first controller for receiving commands from a first player and a second controller for receiving commands from a second player to at least:
  cause a plurality of characters existing in the virtual space and controlled by the first player to simultaneously act according to a command received by the first controller and cause a plurality of characters existing in the virtual space and controlled by the second player to simultaneously act according to a command received by the second controller,
  wherein the simultaneously-acting characters controlled by the first player have the same appearance as each other and the simultaneously-acting characters controlled by the second player have the same appearance as each other, and the appearance of the simultaneously-acting characters controlled by the first player differs from the appearance of the simultaneously-acting characters controlled by the second player,
  wherein the game program, when executed, further causes the computer to increase the number of simultaneously-acting characters controlled by the first player when any of the characters controlled by the first player satisfies a first condition, and increase the number of simultaneously-acting characters controlled by the second player when any of the plurality of characters controlled by the second player satisfies a second condition, and
  wherein the first condition is that any of the simultaneously-acting characters controlled by the first player performs a predetermined action on any of the simultaneously-acting characters controlled by the second player, and when the first condition is satisfied, the number of simultaneously-acting characters controlled by the first player is increased by changing the character controlled by the second player on which the action has been performed to a character controlled by the first player, and the second condition is that any of the simultaneously-acting characters controlled by the second player performs a predetermined action on any of the simultaneously-acting characters controlled by the first player and, when the second condition is satisfied, the number of simultaneously-acting characters controlled by the second player is increased by changing the character controlled by the first player on which the action has been performed to a character controlled by the second player.

2. The non-transitory computer-readable storage medium according to claim 1,
  wherein the number of simultaneously-acting characters is increased on conditions that the increasing does not cause an upper limit of the number of simultaneously-acting characters to be exceeded.

3. The non-transitory computer-readable storage medium according to claim 2,
wherein the upper limit is an upper limit of the sum of the numbers of simultaneously-acting characters controlled by all of the plurality of players.

4. The non-transitory computer-readable storage medium according to claim 1,
wherein the same first ability is provided to all of the simultaneously-acting characters controlled by the first player and the same second ability is provided to all of the simultaneously-acting characters controlled by the second player.

5. The non-transitory computer-readable storage medium according to claim 1,
wherein when an ability of any of the simultaneously-acting characters controlled by the first player changes, the ability of the other simultaneously-acting characters controlled by the first player changes in the same way, and when an ability of any of the simultaneously-acting characters controlled by the second player changes, the ability of the other simultaneously-acting characters controlled by the second player changes in the same way.

6. The non-transitory computer-readable storage medium according to claim 5,
wherein when an ability of any of the simultaneously-acting characters controlled by the first player improves, the ability of the other simultaneously-acting characters controlled by the first player improves in the same way, and when an ability of any of the simultaneously-acting characters controlled by the second player improves, the ability of the other simultaneously-acting characters controlled by the second player improves in the same way.

7. The non-transitory computer-readable storage medium according to claim 1,
wherein when any of the simultaneously-acting characters controlled by the first player is attacked by a character controlled by the second player, movement of the attacked character is restricted, and when any of the simultaneously-acting characters controlled by the second player is attacked by a character controlled by the first player, movement of the attacked character is restricted.

8. The non-transitory computer-readable storage medium according to claim 1,
wherein when any of the simultaneously-acting characters controlled by the first player satisfies a damage condition, the character is eliminated from the virtual space, and when any of the simultaneously-acting characters controlled by the second player satisfies a damage condition, the character is eliminated from the virtual space.

9. A game apparatus configured to execute a game in which each of a plurality of players controls a plurality of characters of the player in a virtual space, the game apparatus comprising:
a first controller for receiving a command from a first player;
a second controller for receiving a command from a second player; and
a hardware processor configured to cause a plurality of characters existing in the virtual space and controlled by the first player to simultaneously act according to the command received by the first controller and to cause a plurality of characters existing in the virtual space and controlled by the second player to simultaneously act according to the command received by the second controller,
wherein the simultaneously-acting characters controlled by the first player have the same appearance as each other and the simultaneously-acting characters controlled by the second player have the same appearance as each other, and the appearance of the simultaneously-acting characters controlled by the first player differs from the appearance of the simultaneously-acting characters controlled by the second player,
wherein the hardware processor is configured to increase the number of simultaneously-acting characters controlled by the first player when any of the simultaneously-acting characters controlled by the first player satisfies a first condition, and to increase the number of simultaneously-acting characters controlled by the second player when any of the plurality of simultaneously-acting characters controlled by the second player satisfies a second condition, and
wherein the first condition is that any of the simultaneously-acting characters controlled by the first player performs a predetermined action on any of the simultaneously-acting characters controlled by the second player, and when the first condition is satisfied, the number of simultaneously-acting characters controlled by the first player is increased by changing the character controlled by the second player on which the action has been performed to a character controlled by the first player, and the second condition is that any of the simultaneously-acting characters controlled by the second player performs a predetermined action on any of the simultaneously-acting characters controlled by the first player and, when the second condition is satisfied, the number of simultaneously-acting characters controlled by the second player is increased by changing the character controlled by the first player on which the action has been performed to a character controlled by the second player.

10. A game system configured to execute a game in which each of a plurality of players controls a plurality of characters of the player in a virtual space, the game apparatus comprising:
a first controller for receiving a command from a first player;
a second controller for receiving a command from a second player;
a memory configured to store a game program; and
a hardware processor communicatively coupled to the memory and configured to execute the game program to cause a plurality of characters existing in the virtual space and controlled by the first player to simultaneously act according to the command received by the first controller and to cause a plurality of characters existing in the virtual space and controlled by the second player to simultaneously act according to the command received by the second controller,
wherein the simultaneously-acting characters controlled by the first player have the same appearance as each other and the simultaneously-acting characters controlled by the second player have the same appearance as each other, and the appearance of the simultaneously-acting characters controlled by the first player differs from the appearance of the simultaneously-acting characters controlled by the second player,
wherein the hardware processor is configured to increase the number of simultaneously-acting characters controlled by the first player when any of the simultaneously-acting characters controlled by the first player satisfies a first condition, and to increase the number of simultaneously-acting characters controlled by the second player when any of the simultaneously-acting characters controlled by the second player satisfies a second condition, and wherein the first condition is that any of the simultaneously-acting characters controlled by the first player performs a predetermined action on any of the simultaneously-acting characters controlled by the second player, and when the first condition is satisfied, the number of simultaneously-acting characters controlled by the first player is increased by changing the character controlled by the second player on which the action has been performed to a character controlled by the first player, and the second condition is that any of the simultaneously-acting characters controlled by the second player performs a predetermined action on any of the simultaneously-acting characters controlled by the first player and, when the second condition is satisfied, the number of simultaneously-acting characters controlled by the second player is increased by changing the character controlled by the first player on which the action has been performed to a character controlled by the second player.

11. A game processing method of executing, by a processor, a game in which each of a plurality of players controls a plurality of characters of the player in a virtual space, the game method comprising:

receiving a command from a first player;

receiving a command from a second player; and causing a plurality of characters existing in the virtual space and controlled by the first player to simultaneously act according to the command from the first player and causing a plurality of characters existing in the virtual space and controlled by the second player to simultaneously act according to the command from the second player, wherein the simultaneously-acting characters controlled by the first player have the same appearance as each other and the simultaneously-acting characters controlled by the second player have the same appearance as each other, and the appearance of the simultaneously-acting characters controlled by the first player differs from the appearance of the simultaneously-acting characters controlled by the second player, wherein the method further comprises increasing the number of simultaneously-acting characters controlled by the first player when any of the simultaneously-acting characters controlled by the first player satisfies a first condition, and increasing the number of simultaneously-acting characters controlled by the second player when any of the simultaneously-acting characters controlled by the second player satisfies a second condition, and wherein the first condition is that any of the simultaneously-acting characters controlled by the first player performs a predetermined action on any of the simultaneously-acting characters controlled by the second player, and when the first condition is satisfied, the number of simultaneously-acting characters controlled by the first player is increased by changing the character controlled by the second player on which the action has been performed to a character controlled by the first player, and the second condition is that any of the simultaneously-acting characters controlled by the second player performs a predetermined action on any of the simultaneously-acting characters controlled by the first player and, when the second condition is satisfied, the number of simultaneously-acting characters controlled by the second player is increased by changing the character controlled by the first player on which the action has been performed to a character controlled by the second player.

\* \* \* \* \*